Dec. 5, 1933.  W. A. HART  1,938,424
BROACHING TOOL
Filed March 19, 1932  2 Sheets-Sheet 2
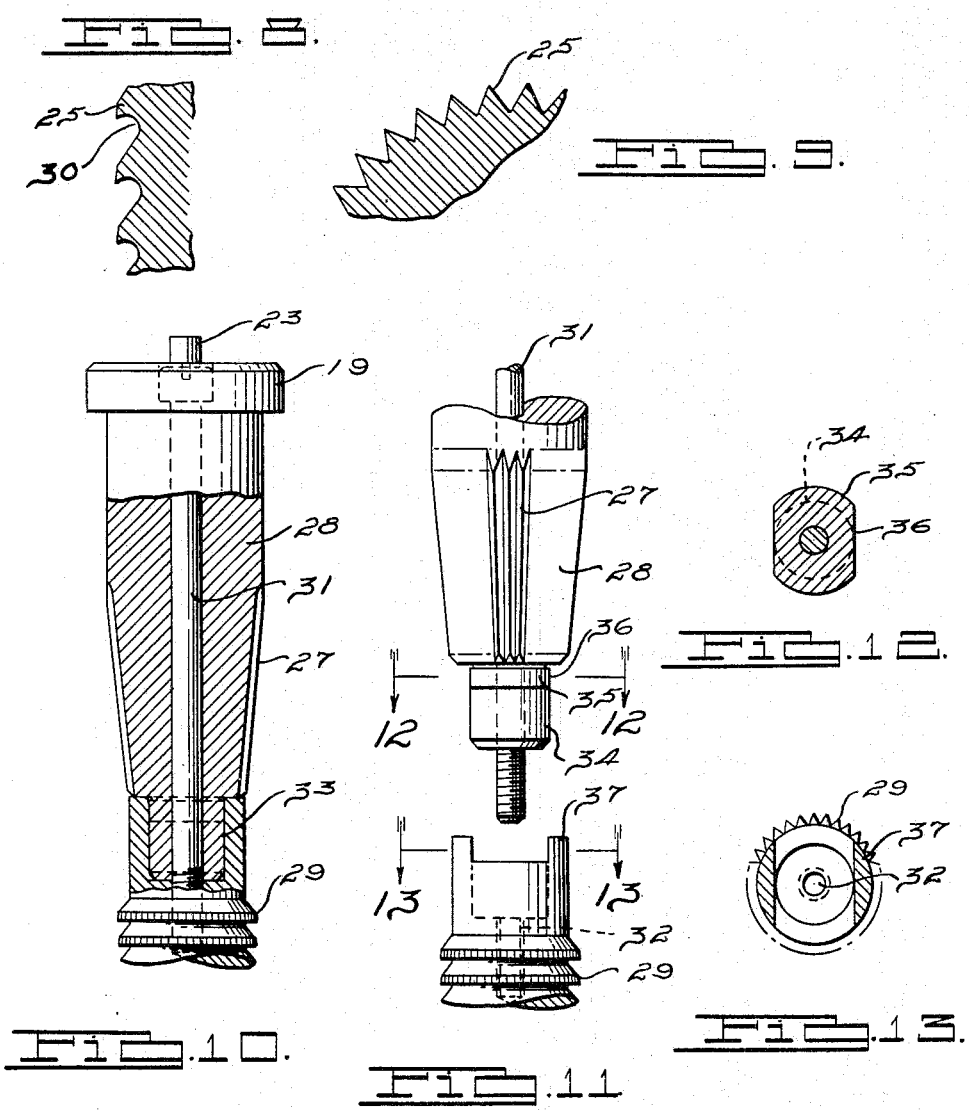

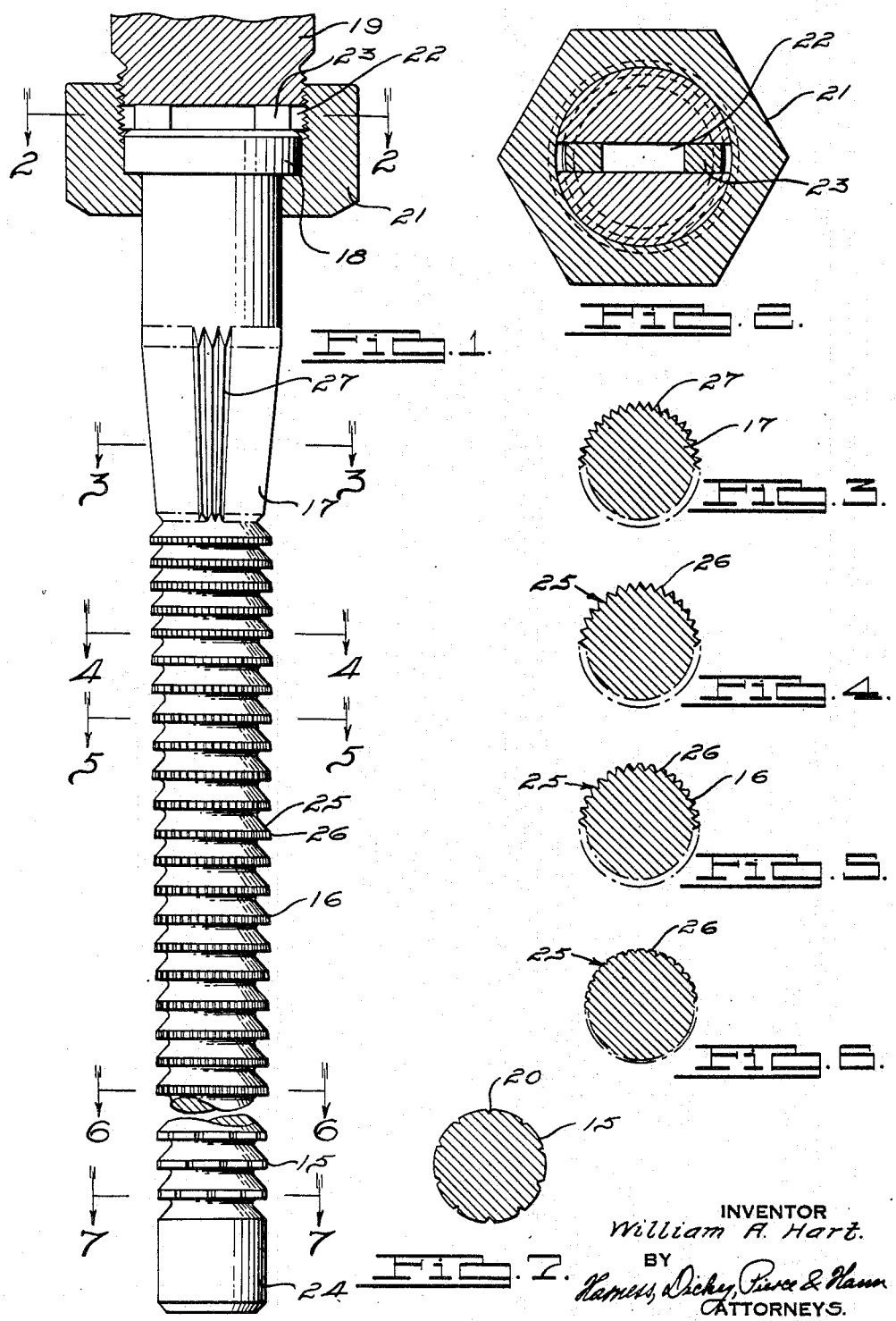

Patented Dec. 5, 1933

1,938,424

UNITED STATES PATENT OFFICE 1,938,424

BROACHING TOOL

William A. Hart, Detroit, Mich., assignor to Colonial Broach Company, a corporation of Michigan Application March 19, 1932. Serial No. 599,935

8 Claims. (Cl. 90—33)

My invention relates to cutting and swaging tools and particularly to a composite tool embodying annular broaching, serrated broaching, and swaging portions which cooperate with each other for forming a tapered serrated surface in an aperture.

When a shaft is to be interconnected to an operating arm, the connection may be made by various methods but I prefer to employ a tapered aperture in the arm and provide a tapered end on the shaft which projects in said aperture. On the inner and outer surfaces, respectively, of the aperture and shaft, I position a plurality of serrations, forming apexed lands and grooves which intermesh with each other when drawn together to form a substantially integral connection. When at any time wear occurs between the lands to permit play between the arm and the shaft, the drawing of the shaft within the aperture wedges the lands and grooves together to again tighten the elements in rigid relation.

My invention relates to the method which I employ for serrating the aperture of the arm to form the lands and grooves on the side thereof and to taper the aperture by a swaging operation, all of which is effected by a single operation. For accomplishing this result, I provide a tool which is formed substantially of three parts, first an end portion, in the nature of an annular broach, for trueing the aperture to a predetermined dimension, following which a serrated broach portion is provided which cuts a plurality of serrations, forming the apexed lands and grooves on the side of the aperture, followed further by a tapered swaging tool having lands and grooves thereon for tapering the aperture at the end of the stroke of the tool.

The tool is mounted on a suitable machine or press and the work disposed relative thereto so as to permit the tool to be forced through the aperture to first true the aperture to accurate dimensions, after which the serrated broaching portion of the tool cuts the serrations therein, followed by the swaging portion of the tool having lands and grooves thereon which mate with the serrations cut in the sides of the aperture and which swages the metal of the aperture outwardly to form a taper therein, all of which is accomplished with a single movement of the tool.

The main objects of my invention are; to provide a tool for effecting a serrated, truncated conical side wall in an aperture through a single manipulation of a tool; to provide a unit tool having three portions combined therein, first an annular broach for sizing the aperture, second a serrated broach for providing serrations therein and third, a swaging portion for sloping the sides of the aperture; to provide a tool in which the broaching and swaging portions may be separate units and which are interconnectable to form a unit tool; and in general to provide a unit tool for serrating and sloping an aperture which is simple in construction, efficient in operation and economical of manufacture.

Other objects and features of my invention will be either specifically pointed out or will become apparent when referring, for a better understanding of my invention, to the following description in conjunction with the accompanying drawings, wherein:

Figure 1 is a broken view, partly in section and partly in elevation of a combination tool embodying features of my invention, Fig. 2 is a sectional view of the structure illustrated in Fig. 1, taken on the line 2—2 thereof, Fig. 3 is a sectional view of the structure illustrated in Fig. 1, taken on the line 3—3 thereof, Fig. 4 is a sectional view of the structure illustrated in Fig. 1, taken on the line 4—4 thereof, Fig. 5 is a sectional view of the structure illustrated in Fig. 1, taken on the line 5—5 thereof, Fig. 6 is a sectional view of the structure illustrated in Fig. 1, taken on the line 6—6 thereof, Fig. 7 is a sectional view of the structure illustrated in Fig. 1, taken on the line 7—7 thereof, Fig. 8 is an enlarged, broken longitudinal view, in section, taken through a plurality of teeth forming the broaching portion of the tool illustrated in Fig. 1, Fig. 9 is an enlarged, broken sectional view of the structure illustrated in Fig. 3, Fig. 10 is a broken view, partly in section and partly in elevation, of a modified form of the tool illustrated in Fig. 1, Fig. 11 is a broken view, in elevation, of the structure illustrated in Fig. 10, with the parts thereof separated, Fig. 12 is a sectional view of the structure illustrated in Fig. 11, taken on the line 12—12 thereof, and Fig. 13 is a sectional view of the structure illustrated in Fig. 11, taken on the line 13—13 thereof.

My unit tool comprises an end portion 15 in the nature of an annular broach, a central portion 16, in the nature of a serrated broach and a third or opposite end portion 17 in the nature of a swage. The tool is cylindrical in shape and is provided with a flange 18 on the swaging end 17 by which connection is made to an arbor 19 of a press or similar machine. A collar 21 engages the flange 18 and is threaded or otherwise secured to the end of the arbor 19 for retaining the tool in fixed extension thereof. When it is desirable to prevent the rotation of the tool relative to the arbor, the arbor 19 is provided with a slot 22 in which a pair of projections 23 on the tool, extend, as illustrated more clearly in Fig. 2. The opposite end of the tool is provided with a guide portion 24 which aids in positioning the work relative to the tool to permit the machining of the side walls of the aperture thereof by the annular broaching portion 15, illustrated in Fig. 7. The cutting edges of the teeth of the annular broaching portion are notched at 20 to break up the continuity of material cut by the teeth.

After the side walls of the aperture have been broached to a predetermined dimension by the passage of the lower end of the tool therethrough, the broaching portion 16 of the tool passes through the aperture and machines serrations of angle shape, in the side thereof. The broaching portion 16 is provided with a plurality of broaching teeth 25 of progressive diameter, as illustrated in Figs. 4, 5 and 6. The teeth are provided with serrated cutting edges 26 which increase in height from the front to the rear of the broach portion, as illustrated in Figs. 6 and 4, respectively. The rear teeth of the broach portion finish the side walls to have accurately disposed serrations therein.

The truncated conical swaging portion 17 of the tool has a plurality of lands 27 thereon which mesh with the groove in the aperture, and as the swaging portion of the tool passes into the aperture, the metal forming the boundary thereof, is forced outwardly to assume the tapered form of the tool having the tapered serrations therein. When employing my unit tool, it will be very apparent that the time required to perform the several operations on a work piece to form sloping serrations on the inner surface of an aperture thereof, is materially reduced.

Referring to Fig. 8, it will be noted that the teeth 25 of the broach are relieved from the top cutting edges rearwardly thereof to prevent the body portion of the teeth, back of the cutting edge from contacting the surface cut by the teeth. A relief is also provided on the front portion of the cutting edge, as is the common practice, for providing recesses 30 for the chips cut by the teeth. In Fig. 9, the teeth 25 are shown in finished form, being the teeth disposed on the last few rows of the broaching portion 16 of the tool, for finishing the serrations or grooves to accurate dimensions.

Referring to Figs. 10 to 13 inclusive, I have illustrated a modified form of tool wherein the swaging portion 28, similar to the swaging portion 17 of the unit tool illustrated in Fig. 1, is a separate element being attachable to the broaching portion 29, which is similar to the broaching portion 16 of the tool illustrated in Fig. 1, by the single screw 31 which extends through the central portion of the swaging element 28 into the threaded portion 32 of the broach. A socket connection 33 includes a circular extension 34 on the swaging element 28, that terminates in a flange 35 having flat side portions 36, as illustrated more clearly in Fig. 12. The side portions 36 are received between a pair of projecting arms 37 provided on the broach portion 29, as illustrated in Figs. 11 and 13. In view of this socket connection, the swaged element 28 is retained in aligned relation with the broach portion 29 of the tool, to have the teeth 25 of the broach retained in aligned relation with the lands 27 provided on the swage.

The utility of this construction resides in the renewability of either the swaging element 28 or the broach portion 29 of the tool without the necessity of renewing the other portion when either portion has become damaged. It is to be understood that the modified structure, as illustrated in Figs. 10 to 13 inclusive, is employed in the same manner as the unit tool illustrated in Fig. 1, for completing the entire machining of an element through a single passage of the tool through an aperture to form lands and grooves on its inner surface which are disposed in sloping relation to its axis.

While I have described and illustrated but two embodiments of my invention, it will be apparent to those skilled in the art that various changes, omissions, additions and substitutions may be made therein without departing from the spirit and scope of my invention, as set forth in the accompanying claims.

I claim:

1. A unit tool including, in combination, a broaching portion for truing the walls of an aperture, a second broaching portion for serrating said trued wall, and a swaging portion for sloping the serrated wall to provide a predetermined taper thereto.

2. A unit tool including, in combination, a broaching portion for truing the walls of an aperture, a second broaching portion for serrating said wall, a swaging portion for sloping the serrated wall, and a guide portion on the leading end of said tool.

3. A unit tool including, in combination, a broaching portion for truing the walls of an aperture, a second broaching portion for serrating said trued wall, and a swaging portion for sloping the serrated wall, a guide portion on the leading end of said tool, and a supporting portion on the opposite end thereof.

4. A tool including, in combination, a broaching portion for truing the walls of an aperture, a second broaching portion for serrating said trued wall, and a swaging portion for sloping the serrated wall, at least one of said portions being separable.

5. A tool including, in combination, a broaching portion for truing the wall of an aperture, a second broaching portion for serrating said trued wall, a swaging portion for sloping the serrated wall, at least one of said portions being separable, and means for securing said separable portions in aligned extension of each other.

6. A unit tool including, in combination, a broaching portion for serrating the wall of an aperture, and a sloping swaging portion for tapering said serrated wall.

7. A unit tool including, in combination, a broaching portion for serrating the wall of an aperture, and a tapered swaging portion for sloping the serrations and wall, said portions being separable, and means for securing said separable portions in aligned extension of each other.

8. A unit tool for shaping the aperture of a work piece by a single operation including, in combination, a broaching portion employed for machining the aperture to predetermined dimensions, a second broaching portion employed to serrate the surface of said aperture, and a sloping swaging portion utilized for tapering the serrated side of said aperture a predetermined amount relative to the central axis of said aperture.

WILLIAM A. HART.